Patented Feb. 2, 1943

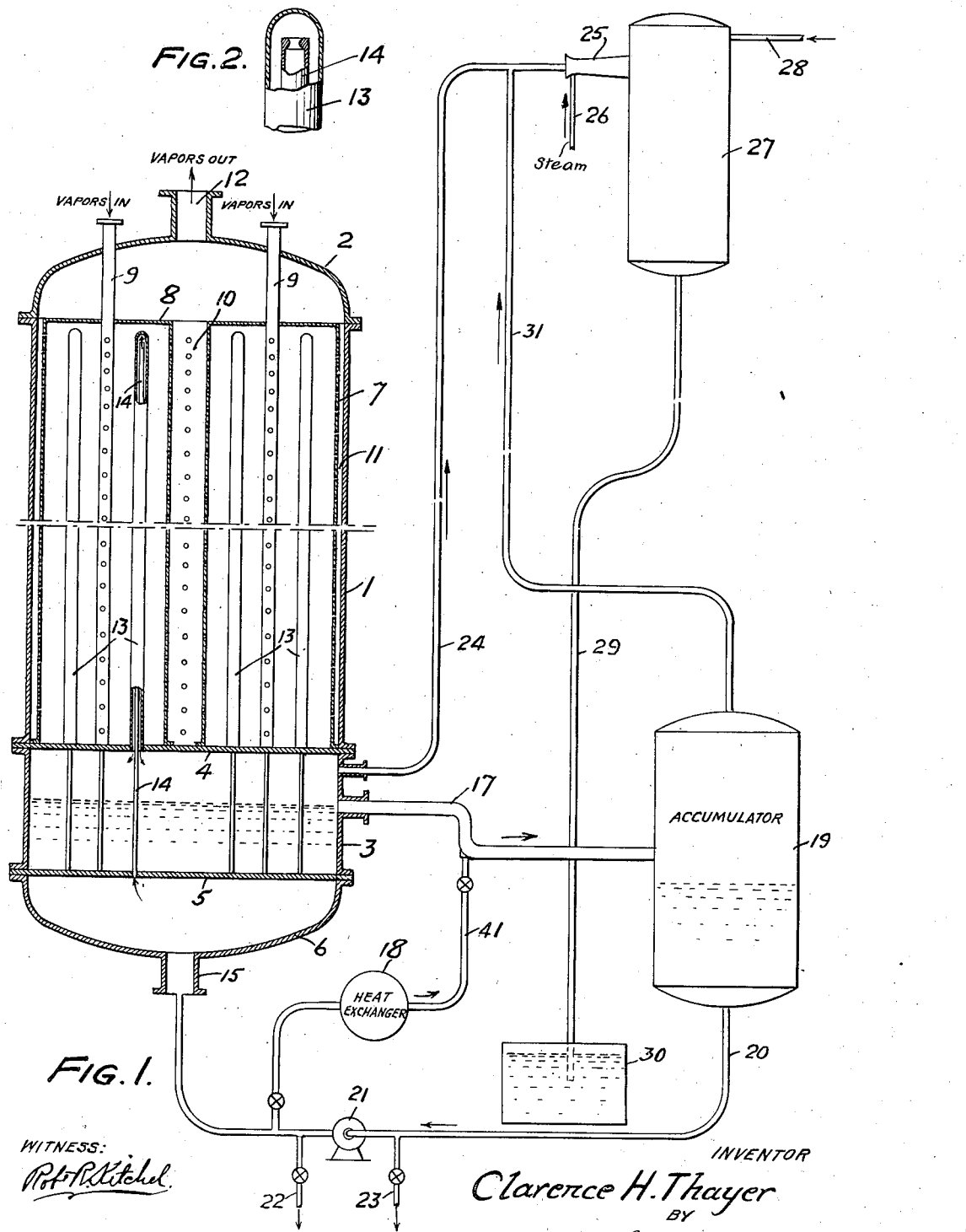

2,309,996

UNITED STATES PATENT OFFICE 2,309,996

PROCESS AND APPARATUS FOR REGULATING THE TEMPERATURE OF CATALYTIC MASSES

Clarence H. Thayer, Wallingford, Pa., assignor to Sun Oil Company, Philadelphia, Pa., a corporation of New Jersey Application March 6, 1940, Serial No. 322,458

3 Claims. (Cl. 196—52)

The present invention relates to catalytic reactions and particularly to a method and apparatus for effecting heat exchange within a catalyst mass in which either an endothermic or exothermic reaction is being carried out.

It it well known that the cracking of hydrocarbon oil, whether carried out pyrolytically or catalytically, is an endothermic reaction, i. e., the reaction itself consumes heat. In pyrolytic cracking this does not present any difficulties, as the oil being cracked is usually carried through tubes placed within a furnace. However, when the cracking is being performed catalytically, if it is desired to maintain the catalyst mass at as even a temperature as possible, heat must be supplied to the mass by extraneous means. The input of heat to the catalyst has been carried out by passing a heating fluid through tubes imbedded within the mass.

During any catalytic cracking operation a certain amount of carbonaceous material is deposited on the catalyst, which deposit in time lowers the efficiency of the mass, and efficiency can only be restored by regenerating the catalyst. Regeneration is effected by blowing an oxidizing medium through the catalyst in order to oxidize the carbonaceous deposit. This oxidation might well be termed combustion as the reaction is extremely exothermic. Since catalysts of the clay type may not be heated to temperatures above 1050–1150° F. without injuring them or seriously reducing their activity, it is necessary to maintain the temperature by withdrawing the heat of regeneration therefrom. This has been accomplished by passing a heat exchange fluid through the tubes, within the catalyst mass, that are used to heat the mass during the on-stream or cracking portion of the cycle. It has also been customary in the cracking of hydrocarbon oils to employ spur tubes extending down into the mass and having small tubes within such spur tubes in order to feed the heat exchange fluid to the spur tubes. Since the fluid entering and flowing down through the smaller internal tubes exchanges heat with the same fluid flowing in the opposite direction and leaving the spur tubes, there is a substantially even heat exchange throughout the catalytic mass.

It has also been customary to employ water as a heat exchange medium. When water has been employed the spur tubes and their internal tubes could be easily cleared of water, as a mere pressure reduction permitted the water to evaporate and pass out as steam, leaving the tubes dry. It has lately been proposed to use, as a heat exchange medium, an eutectic mixture of salts such, for example, as mixtures of potassium and sodium nitrites and nitrates. Such mixtures, depending upon their percentage compositions, have a specific gravity of around 1.7 at about 820° F. and a melting point of about 285° F. Since such salts do not vaporize, even at temperatures as high as 1200° F., it is not practical to use spur tubes extending down into the mass, as the salt could not readily be removed therefrom and would consequently solidify if the catalytic case were cooled down to atmospheric temperatures. It is, of course, possible to run tubes through the mass from bottom to top, but such expedient is inadvisable, as it requires the provision of tube sheets, one at each end of the catalytic mass, into which the heat exchange tubes are rolled, thus presenting the difficulty of unequal expansion and contraction of the shell and tubes. In this case the inlet end of the tubes would be considerably hotter than the outlet ends, which would prevent the maintenance of an even temperature throughout the mass.

Due to the objections to the use of plain tubes having a straight flow through the mass, and also due to the difficulty of removing the salt from spur tubes extending down into the mass, it has been proposed as in the patent to Houdry, No. 2,195,414, to provide spur tubes extending up into the mass, and having small tubes within said spur tubes in order to feed the heat exchange fluid through said small tubes to the top of said spur tubes, and then permit the heat exchange medium to flow down the spur tubes. While such an arrangement permits ready removal of salt from the system, it has been found in operation that due to entrapment of air or other gases or vapors in certain of the spur tubes, as more fully explained hereinafter, the flow of the heat exchange medium through all of the tubes has not been uniform, and therefore it has been difficult to maintain an even temperature throughout the mass.

It is therefore an object of this invention to avoid the defects in pre-existing systems of temperature control, and specifically to provide a method and apparatus for circulating a normally solid liquefied medium through spur tubes extending up into the catalytic mass, and in heat exchange relation with the mass, in such a manner as to avoid surging and irregularity of flow of the medium; to thereby insure an even distribution of the medium throughout the mass.

and substantial uniformity in the temperature of the medium throughout the mass, while permitting rapid and complete introduction of the medium to and withdrawal of the medium from operative heat exchange relation with the mass. Other objects and advantages will be apparent from the following description.

Reference may now be had to the accompanying drawings, in which—

Fig. 1 is an elevation, partly in section and partly diagrammatic, showing an apparatus in which the process may be practiced.

Fig. 2 is a detail sectional view of the tops of one of the salt inflow tubes and a surrounding spur tube.

Figure 3:
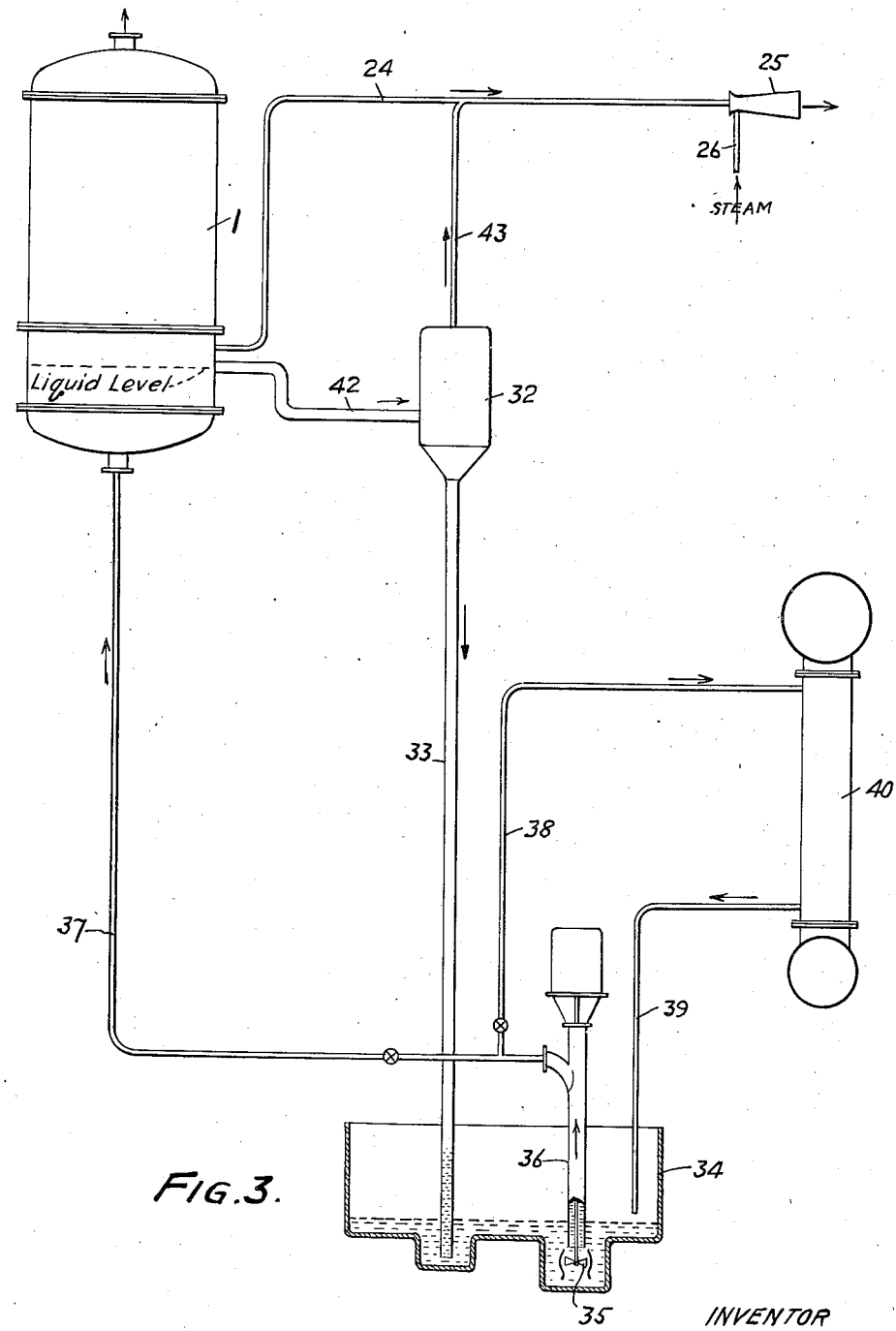
Fig. 3 is an elevation, partly in section and partly diagrammatic, showing a modified salt circulation and air and gas evaporating system.

To a flange on the upper end of the main shell 1 of a catalytic case is bolted a flanged upper head 2. Immediately below the shell 1 is a flanged shell 3 which is bolted to a tube sheet 4 and a lower flange on the lower end of shell 1. A second tube sheet 5 is bolted between a flange on the lower end of shell 3 and a flange on a lower head 6. Within the shell 1 and resting on the tube sheet 4 is an annular perforated catalytic jacket 7 having a cover plate 8. Extending down into the catalyst jacket 7 is a plurality of tubes 9 through which vapors to be treated are passed. That portion of each tube 9 which is within the catalyst jacket 7 is perforated to distribute the vapors, which then flow to an internal (central) flue 10 and to the annular space 11 between the jacket 7 and the shell 1 and thence upward through said space and flue and out through the nozzle 12 in the upper head.

The tube sheet 4 has spur tubes 13 rolled therein to form a fluid-tight joint. Extending up into the tubes 13 are plain tubes 14 which are rolled into the tube sheet 5. The lower head 6 is furnished with a nozzle 15 for the inlet of a heat exchange medium, which, in this case, is a suitable salt. It is evident, therefore, that such heat exchange medium will flow up through the tubes 14, overflow the open tops thereof and thence fall down between the outer walls of the tubes 14 and the inner walls of the spur tubes 13 to the space between the tube sheets 4 and 5. It is of advantage to slightly restrict the tops of the salt inlet tubes 14, as shown in Fig. 2. This restriction operates to exert a slight pressure drop across the orifice, so that the inlet tubes tend to fill and overflow more uniformly. Such restriction also makes positive the circulation of the salt to the tops of the spur tube 13 so that cold spots are not formed on that portion of the catalytic mass.

The heat exchange medium is then removed through line 17 to an accumulator 19. Between the accumulator and the nozzle 15 is a line 20 having a circulating pump 21 therein for maintaining circulation between the accumulator and the catalyst case. The heat gained or lost by the salt during its flow through the catalyst chamber (depending upon whether the reaction therein is endothermic or exothermic) should be removed or restored by interposing a heat exchanger in the path of flow. The temperature can be regulated with more accuracy by interposing such a heat exchanger 18 in a by-pass line 41 connecting lines 20 and 17.

Line 20 is furnished with two valved drain lines 22 and 23 which serve to drain the entire system when it is desired to cool down for cleaning, repairing, etc.

The salt system should be evacuated before starting the apparatus. Otherwise the falling down of the heavy salt between the spur tubes 13 and the inner tubes 14 would entrain and remove air from the upper portions of some of the spur tubes, creating a partial vacuum therein, while other spur tubes in which circulation has not yet been established would contain air at approximately atmospheric pressure therein. To establish complete and uniform circulation in all the tubes I provide the following means for evacuating the entire salt system before introduction of the salt to the catalytic case.

Near the top of the shell 3 is a line 24 communicating with a jet 25 to which steam is furnished through line 26. Jet 25 communicates with a barometric condenser 27 to which cooling water is fed through line 28. The bottom of barometric condenser 27 has a barometric column 29 leading to a well shown diagrammatically at 30.

When it is desired to start up the apparatus, steam is supplied to the jet 25 and the entire apparatus is evacuated to as low a degree as possible. Circulation of molten salt is then started. Since there is no atmosphere within the spur tubes 13, the entrainment action above described cannot occur. Therefore, after the circulation at the proper rate is established, the circulation through the various tubes is uniform and heat is evenly supplied to or removed from the catalyst contained within the envelope 7. It is preferable, and it is practically necessary, to maintain the jet 25 in continuous operation, as it is impracticable to maintain the system absolutely air tight, and salt, unless in a chemically pure state, is subject to some decomposition, forming gases which, if not removed, would have the same objectionable action as air. In those claims which mention the step of exhausting or excluding gas from the salt flow paths I mean to include both air and vaporous products of decomposition.

Since the heat exchange medium that will desirably be employed solidifies at temperatures, depending upon its composition, above or below, but approximating, 285° F., it is necessary to provide a heated sump to which all heat exchange media in the system may be drawn at will. Such sump would be connected to lines 22 and 23 and would be provided with means, such as high temperature steam coils, to liquefy the salt when starting up.

As the regeneration gives off more heat than would be necessary to maintain other cracking cases in the system at the required temperature, it is necessary to supply a heat exchanger, such as 18, to remove surplus heat either by heat-exchange with water to form steam or by heat-exchange with liquid oil or vapors flowing toward a case operating on the cracking portion of the cycle.

The apparatus shown in Figure 3 obviates the necessity of maintaining a vacuum on the entire salt system. The molten salt is removed from the catalytic case through a line 42, vacuum chamber 32 and stand pipe 33 to a container 34 (which may be under atmospheric pressure) from which the salt is pumped, by means of a propeller 35, up through a tube 36 and thence, through line 37, to the catalytic case and, through line 38, to a heat exchanger 40 diagrammatically illustrated as a steam boiler in which the water is adapted to be heated by indirect heat exchange with the molten salt and thence back through line 39 to container 34. The pipe line 24, jet 25, and steam supply pipe 26 correspond to the similarly numbered parts in Fig. 1. A line 43 connects line 24 with vacuum chamber 32. No barometric condenser is provided, the steam 25 exhausting to the atmosphere. It is necessary, however, to maintain a column of salt in standpipe 33 equal to a barometric column, which would be proportionate to the specific gravity of the salt mixture.

While only one catalyst case has been shown, it is obvious that more than one would have to be used in order to provide active catalyst for cracking a constantly flowing stream of gases. It is therefore apparent that a portion of the fluid passing from one case on regeneration may be passed to a case in which cracking is occurring in order to furnish heat thereto.

While the description herein has been limited to a process wherein hydrocarbon oils are cracked it is to be understood that the invention is not limited thereto as the method and apparatus may be employed for any catalytic reaction whether endothermic or exothermic, the description given herein being exemplary only.

While in the foregoing description the specific heat exchange medium referred to is a salt which is normally solid, it is not intended to exclude the use, as an equivalent, of any heat exchange medium, whether normally solid or normally liquid, provided that it is not vaporizable at operating temperatures and is also found practicable and efficient in other respects.

What I claim and desire to protect by Letters Patent is:

1. The process of applying heat to, or withdrawing heat from, a catalytic mass in which an endothermic or exothermic reaction is being carried out, which comprises maintaining a body of a heat exchange medium in liquid phase directly beneath said catalyst mass, maintaining a vapor space immediately above said body, but out of contact with said catalyst mass, flowing a stream of such medium upward through but out of contact with said body and said vapor space and thence upward through but out of contact with such mass and thence downward in an annular stream surrounding the upflowing stream and out of contact, but in heat exchange relation with, the catalyst mass and thence through said vapor space and into said body of the liquefied medium, maintaining said downwardly flowing stream in open communication with said vapor space, flowing a stream of said medium away from said body and changing its temperature to about that which it had at the beginning of its upward flow and again flowing it upward as aforesaid, thereby establishing an endless circulation of the heat-exchange medium, and prior to establishing said circulation exhausting gas from said vapor space, and maintaining said vapor space under a vacuum while said circulation is proceeding to remove therefrom any gas entering the same.

2. The combination, with a catalytic converter comprising a reaction chamber and vertically disposed vapor inlet and outlet channels extending thereinto, of closed channels for the circulation of a heating medium in liquid phase; said last named channels comprising a closed chamber directly beneath the cracking chamber for containing a body of said medium, outflow tubes whose discharge mouths open into the second named chamber at a point near the top thereof and which extend upward therefrom to near the top of the cracking chamber and are thereat closed, inflow tubes extending through the second chamber and thence upward through the outflow tubes and opening thereinto near the latter's closed upper ends, and a flow passage communicating at its one end with said second chamber at a point below the top thereof and adapted to maintain a liquid level of said medium in said second chamber below the discharge mouths of said outflow tubes and communicating at its other end with the lower inflow ends of the inflow tubes, another flow passage connected with said second chamber at a point near the top thereof and above the liquid level therein and means to evacuate gas therethrough.

3. The combination, with a catalytic cracking apparatus comprising a cracking chamber and vertically disposed vapor inlet and outlet channels extending thereinto, of closed channels for the circulation of a heating medium in liquid phase; said last named channels comprising outflow tubes extending from their lower outflow ends through said chamber to near the top thereof and thereat closed, inflow tubes extending from below the outlet ends of the outflow tubes within, and opening at their upper ends into, and near the closed upper ends of, the outflow tubes, and a flow passage communicating at its opposite ends with the lower outflow ends of the outflow tubes and the lower inflow ends of the inflow tubes, the upper ends of said inflow tubes where they communicate with the closed upper ends of said outflow tubes being constricted in internal diameter thereby to create a slight pressure drop across the outlet orifices tending to maintain a more uniform overflow of heating medium therefrom.

CLARENCE H. THAYER.